Sept. 25, 1962

J. H. HOLLYDAY 3,055,519

CONVEYOR

Filed Sept. 26, 1960

INVENTOR
JAMES H. HOLLYDAY
Joseph A. Brown
ATTORNEY

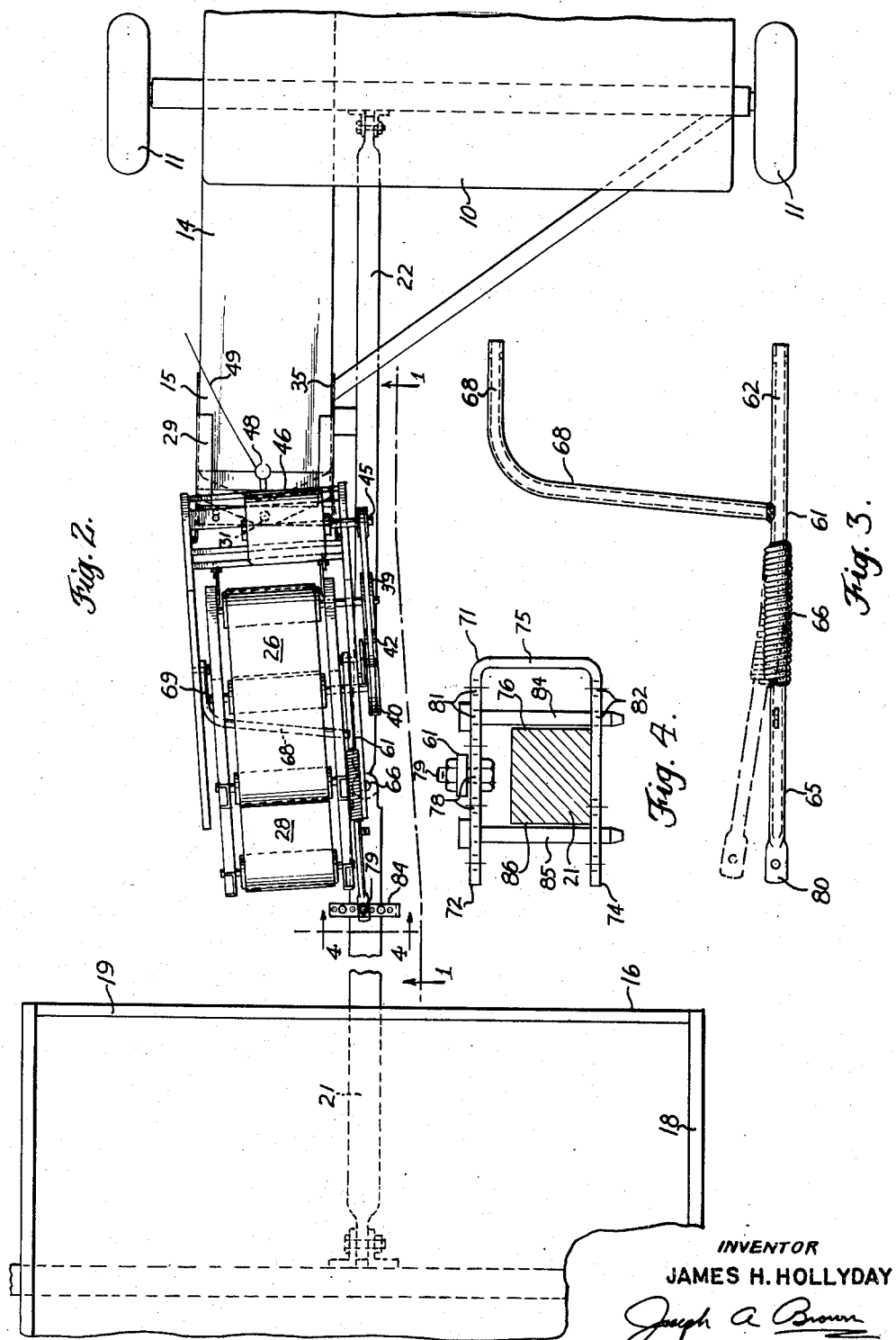

United States Patent Office 3,055,519
Patented Sept. 25, 1962

3,055,519
CONVEYOR
James H. Hollyday, New Holland, Pa., assignor to Sperry Rand Corporation, New Holland, Pa., a corporation of Delaware
Filed Sept. 26, 1960, Ser. No. 58,537
16 Claims. (Cl. 214—42)

This invention relates to a bale thrower swingably mounted on the discharge end of a hay baler and operable to traject each bale emerging from the baler to a trailing wagon. More particularly, the invention relates to improved means for connecting the thrower to the tongue of the wagon.

Heretofore, a bale thrower has been provided which is mounted on the discharge end of a baler bale chamber for lateral swinging movement relative thereto about a fixed vertical axis. Trailing the baler is a wagon having a tongue extending forwardly and hitched to the baler. When the baler changes its direction of travel, the longitudinal axis of the fore-and-aft extending bale chamber becomes angularly displaced relative to the longitudinal axis of the wagon. To keep the thrower aimed toward the wagon, a link connection is provided between the thrower and the wagon tongue which produces a lateral swinging movement of the thrower to the left or right from a normal neutral position when the baler changes direction to the left or right, as the case may be. Such swinging movement of the thrower helps to insure that trajected bales will land in the wagon regardless of the relative position of the baler and wagon.

Different wagons on the market have different tongues. Therefore, it is necessary that the means for linking the thrower to the wagon tongue be universal to take into account different tongue sizes. Also, it is desirable to have the linking means out of the way and protected against damage when not connected to a wagon tongue. Still further, it sometimes happens that the baler operator so maneuvers the baler that the trailing wagon and the baler become sharply angularly disposed relative to each other. This may tend to bend, break or otherwise damage the linking means between the thrower and the tongue. Such damage is obviously undesirable.

One object of this invention is to provide improved means for connecting a bale thrower to a wagon tongue whereby the thrower will be swung laterally or steered responsive to changes in direction between the baler on which the thrower is carried and the wagon trailing behind the baler.

Another object of this invention is to provide improved connecting means between a bale thrower and a wagon tongue, such connecting means incorporating therein means to protect the connecting structure from damage should the baler make a very sharp turn relative to the wagon.

Another object of this invention is to provide connecting means of the character described which is retracted to an out of the way position when not in use whereby it will be protected from damage.

Another object of this invention is to provide connecting means of the character described through which a satisfactory connection can be made with a given wagon tongue regardless of the cross section of the tongue, such connection resisting up and down and lateral movement of the connection with the tongue but allowing longitudinal shifting movement of the connection.

A further object of this invention is to provide connection means of the character described having adjustment structure incorporated therein whereby the attachment to the wagon tongue is easily variable as desired.

A still further object of this invention is to provide connecting means of a character described which is simple, inexpensive, easy to manufacture, assemble and repair.

Other objects of this invention will be apparent hereinafter from the specification and from the recital in the appended claims.

In the drawings:

FIG. 2 is a plan view of FIG. 1;

FIG. 3 is enlarged plan view of the connection means between the thrower and the wagon tongue; and FIG. 4 is an enlarged section taken on the line 4—4 of FIG. 2 looking in the direction of the arrows and showing the attachment of the connecting means and the wagon tongue.

Figure 1:
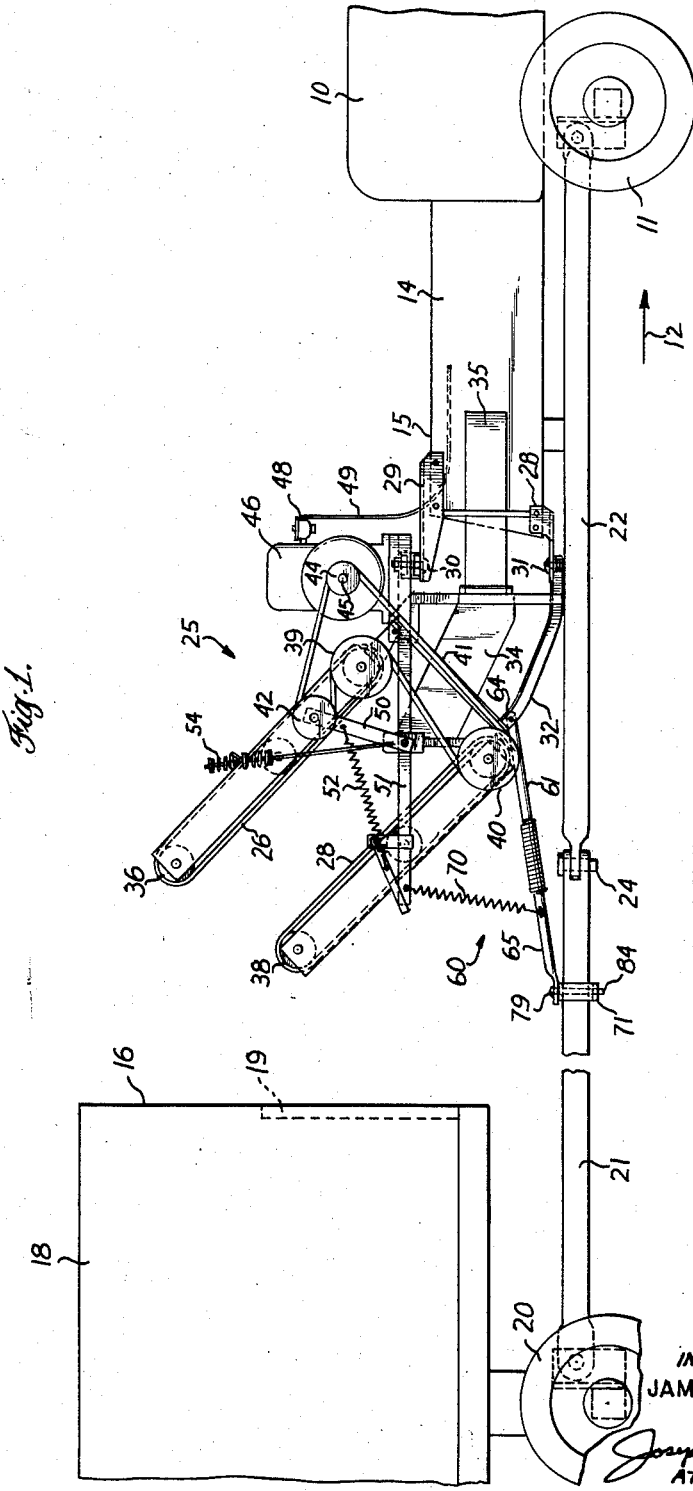
FIG. 1 is a generally diagrammatic side elevation of the rear end of a hay baler, a wagon towed by the baler, a throwing mechanism on the baler adapted to traject emerging bales into the wagon, and means constructed according to this invention for connecting the thrower to the tongue of the wagon; such view is taken on the lines 1—1 of FIG. 2, looking in the direction of the arrows.

Referring now to the drawings by numerals of reference, 10 denotes a hay baler supported on ground wheels 11 and adapted to travel in a direction indicated by the arrow 12 in FIG. 1. Baler 10 includes a bale case 14 having a rear end 15 from which bales emerge. These bales are adapted to be deposited in a wagon 16 having high side walls 18 and a relatively low front wall 19. The wagon has ground wheels 20 and a forwardly extending tongue 21 connected to a rearwardly extending baler drawbar 22 by a vertical hitch pin 24. The hitch pin 24 provides a pivotal connection between tongue 21 and the drawbar 22. Therefore, when the baler 10 changes direction, there will be pivotal movement of the drawbar 22 relative to the tongue 21 about the pin 24.

To traverse the space between the rear end 15 of the bale chamber 14 and the wagon 16, a bale thrower 25 is provided comprising an upper endless conveyor 26 and a lower endless conveyor 28 disposed as shown in FIG. 1. These conveyors comprise belts which extend upwardly and rearwardly toward the wagon 18 and are spaced apart such a distance that they firmly engage the top and bottom of each bale coming from the baler. The thrower is connected to and mounted on the rear end of the bale case 14 by bracket means including a top bracket member 29 and a lower bracket member 28. Such brackets carry vertically aligned pivot pins 30 and 31, respectively, which provide a vertical axis above which the bale thrower 25 is laterally swingable. A bottom guide plate 32 extends from the bottom, rear end of the bale chamber to adjacent the lower forward end of the endless belt 28 to thereby guide the emerging bales to the thrower. Lateral side plates 34 are also provided to guide the emerging bales into the throwing device. The side plates 34 include forwardly extending portions 35 which are slidable relative to the sides of the bale chamber 14.

The upper belt 26 extends around a pair of rollers 36 and the lower belt 28 extends around a pair of rollers 38, as shown. Drive pulleys 39 and 40 are connected to the lower, forward rollers of pairs 36 and 38, respectively, to thereby impart a driving force to endless belts 26 and 28. An endless belt 41 is provided which extends around pulleys 39 and 40, as shown, and around a belt tightener pulley 42 and a drive pulley 44 on the output shaft 45 of an engine 46. When viewed as shown in FIG. 1 the belt 26 rotates in a clockwise direction while the belt 28 rotates in a counterclockwise direction. Each emerging bale is engaged by the belts 26 and 28 and thrown through a trajectory path upwardly and rearwardly relative to the baler and over the front wall 19 of the wagon. The bale lands in the wagon in a fore-and-aft position related to the speed of operation of the thrower. Such speed is regulated by throttle 48 controlled by a cable 49 which extends to the operator of the tractor towing the baler.

The tightener or idler wheel 42 is carried on a lever arm 50 pivotally mounted on framework structure 51 and biased towards a tightening position by spring 52. The upper belt 26 is restrained from bouncing up and down when the baler moves across the field by double acting spring means indicated at 54 and connected between the mounting structure for belt 26 and the framework 51 of the thrower.

To swing the bale thrower laterally about the vertical axis provided by the connecting pins 30 and 31, connecting means 60 is provided between the thrower and the wagon tongue 21. Such means comprises a generally fore-and-aft extending link arm 61 shown best in FIG. 3. Such link arm includes a first section 62 pivotally connected at 64 (FIG. 1) to the bottom guide plate 32 of the thrower. The connection 64 provides a horizontal transverse axis above which the link arm 61 is pivotal. The link arm includes a second section 65 which is longitudinally spaced from the first section 61. These sections are interconnected by a relatively rigid tension spring under initial tension whose ends are welded to the link sections.

When in normal position, the longitudinal axes of first link portion 62, second link portion 65 and spring 66 are all common. However, as shown in dotted lines in FIG. 3, the section 65 is adapted to swing to an angularly disposed position relative to the section 62 and against the bending resistance of the spring 66. Thus, the spring 66 provides a yieldable element in link 61 operable to bend when subjected to a force exceeding a predetermined amount applied to section 65 in any angular direction relative to the longitudinal axis of the link member.

The link member 61 also includes an L-shaped section 68 which traverses the bale thrower, having an end 69 pivotally connected to the thrower by a connecting pin which is coaxial with pivotal connection 64. Thus, the connecting means is swingable vertically about the axes of the connecting pivots.

To bias the connecting means upwardly a spring 70 is provided which is interconnected between the second section 65 of link member 61 and the framework 51 of the thrower. When the connecting means is fastened to the tongue 21, the spring 70 is extended and exerts a continuous upward pulling force on the connecting means. The section 65 is connected to tongue 21 by structure shown best in FIG. 4.

Straddling the tongue 21 is a U-shaped member 71 having an upper leg 72 which extends along the top of the tongue 21 and a lower leg 74 engageable with the bottom of the tongue. The legs 72 and 74 are interconnected by a tight portion 75 which extends along one side face 76 of the tongue. The top leg 72 has a group of holes 78 to provide points where the section 65 of the link arm 61 can be connected to member 71. A bolt 79 projects through a flattened end 80 of the link arm. In addition to connecting the link arm to bracket member 71, it also provides a vertical pivot about which the bracket member is swingable.

The leg 72 has a series of holes 81 which register with a similar series of holes 82 in the lower leg 74. A first lock pin 84 is provided which is extendable through a selected pair of holes in the legs of the bracket member and along the inside 76 of the tongue 21. A second pin 85 is extendable through a selected pair of aligned holes in the legs of the bracket member and along the opposite side face 86 of the tongue 21. The two pins are adapted to be so located that they will minimize the space between the tongue and the pins so that the connection will not flop around.

Since the spring 70 continually lifts the connecting means upwardly, the lower leg 74 will engage the bottom of the tongue while the upper leg 72 will normally be somewhat spaced from the top of the tongue. It will be apparent that with this connection the link arm 61 and the tongue 21 are shiftable relative to each other with the bracket member 71 sliding along the tongue 21. Such sliding will occur when the baler makes a turn and becomes angularly disposed relative to the wagon.

When the operator removes pin 85, he can quickly slide the bracket member 71 from around the tongue 21 to disconnect the thrower from the tongue. When so disconnected, the spring 70 will lift connection means 60 to an out of the way position to thereby prevent it from being damaged. While spring 70 is adequate to hold link arm 61 in elevated position, when it is desired to connect the thrower to the tongue, the link arm is readily manually depressed to provide a connection between parts.

If the baler turns very sharply relative to the wagon 16, the angle between the drawbar 22 and the tongue 21 may become so extensive that there is a tendency to bend the link arm 61. Such bending force may be toward the left or the right depending on which direction the baler has turned. By having the spring 66 interconnecting the sections 62 and 65 of the link arm, the connection means is free to yield without causing damage to the structure. This greatly increases the life of the parts provided. Likewise, it will be noted that the spring 66 is operative regardless of which direction section 65 is moved. Therefore, the spring provides a yielding element which is universal and can compensate for any variations which result or bending forces in the connecting structure.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination, a hay baler adapted to travel forwardly and having a fore-and-aft extending bale case, a wagon towed behind the baler and having a forwardly extending tongue pivotally connected to the baller, said wagon being spaced rearwardly of said bale case, a bale thrower mounted on said bale case to receive bales therefrom and to throw them rearwardly across said space to said wagon, means supporting said bale thrower on said bale case for lateral swinging movement about a vertical axis, a link arm connecting said bale thrower to said wagon tongue to steer the thrower responsive to changes in direction of travel of the baler and resulting angular displacement of said wagon tongue relative to the baler, said link arm normally extending generally in a fore-and-aft direction and having a forward end and a rear end, means connecting said link arm forward end to said bale thrower for pivotal movement about a generally horizontal, transverse axis relative to the extension of the link arm and restraining the link arm forward end from pivotal movement about a vertical axis, means connecting said link arm rear end to said tongue for shiftable movement relative thereto in a fore-and-aft direction, said link arm having a normal extension between said connecting means for said forward and rear ends, and means forming part of said link arm and located intermediate the ends thereof for permitting the link arm to bend laterally from said normal extension, said last named means including a spring biasing said link arm toward said normal extension.

2. The combination recited in claim 1 wherein said spring is under initial tension to exert a positive hold on said link arm when the link arm is extending normally between said forward and rear connecting means.

3. The combination recited in claim 2 wherein a spring is connected between said link arm and said thrower to lift the link arm upwardly when the link arm rear end is disconnected from said tongue.

4. In combination, a hay baler adapted to travel forwardly and having a fore-and-aft extending bale case, a wagon towed behind the baler and having a forwardly extending tongue pivotally connected to the baler, said wagon being spaced rearwardly of said bale case, a bale thrower mounted on said bale case to receive bales therefrom and to throw them rearwardly across said space to said wagon, means supporting said bale thrower on said bale case for lateral swinging movement about a vertical axis, a link arm connecting said bale thrower to said wagon tongue to steer the thrower responsive to changes in direction of travel of the baler and resulting angular displacement of said wagon tongue relative to the baler, said link arm normally extending generally in a fore-and-aft direction and having a forward end and a rear end, means connecting said link arm forward end to said bale thrower for pivotal movement about a generally horizontal, transverse axis relative to the extension of the link arm, means connecting said link arm rear end to said tongue for shiftable movement relative thereto in a fore-and-aft direction, said link arm having a normal extension between said connecting means for said forward and rear ends, and means permitting a portion at least of said link arm to pivot laterally a substantial distance from said normal extension and relative to the horizontal axis of said forward connecting means, said last named means including a spring biasing said link arm toward said normal extension.

5. The combination recited in claim 4 wherein said normal extension is substantially straight.

6. The combination recited in claim 4 wherein means is interconnected between said link arm and the thrower to hold the arm from dropping below said normal extension when detached from said tongue.

7. The combination recited in claim 6 wherein said interconnected means comprises a spring under tension and biasing said link arm upwardly.

8. The combination as recited in claim 6 wherein said spring comprises a relatively rigid tension spring under initial tension and having one end affixed to said one link arm section and an opposite end affixed to said second link arm section.

9. The combination as recited in claim 6 wherein the second link arm section connected to said tongue is detachably connected thereto and wherein means is provided for biasing the link arm sections and said spring in an upward direction whereby when the connection to said tongue is detached the connecting means will be retracted.

10. The combination as recited in claim 6 wherein means is provided for varying the point of connection of said second link arm section to said tongue.

11. In combination, a hay baler adapted to travel forwardly and having a fore-and-aft extending bale case, a wagon towed behind the baler and having a forwardly extending tongue pivotally connected to the baler, said wagon being spaced rearwardly of said bale case, a bale thrower mounted on said bale case to receive bales therefrom and to throw them rearwardly across said space to said wagon, means supporting said bale thrower on said bale case for lateral swinging movement about a vertical axis, a link arm connecting said bale thrower to said wagon tongue to steer the thrower responsive to changes in direction of travel of the baler and resulting angular displacement of said wagon tongue relative to the baler, said link arm normally extending generally in a fore-and-aft direction and having a first section and a second section spaced from each other, means connecting said first section to said bale thrower for pivotal movement about a generally horizontal transverse axis relative to the extension of the link arm and restraining said first section from pivotal movement about a vertical axis relative to the thrower, means connecting said second section to said tongue for shiftable movement relative thereto in a fore-and-aft direction, and a spring connecting said first and second sections and permitting the second section to pivot relative to the first section, said first and second sections and said spring having a normal extension between said two connecting means, said spring storing energy when said second section pivots relative to the first section and from said normal extension, such energy urging the second section back toward said normal extension.

12. The combination recited in claim 11 wherein said first link arm section is connected to one side of said thrower, an L-shaped member being connected to said first link arm section and connecting such first section to the opposite side of the thrower.

13. Means for connecting a bale thrower, laterally swingably mounted on a hay baler, to the tongue of a wagon towed by the baler whereby the thrower will be swung responsive to changes in direction of travel of the baler relative to the wagon comprising a link arm having one end pivotally connected to said thrower and an opposite end adjacent said tongue, a U-shaped member pivotally connected to said link opposite end and being longitudinally shiftable along said tongue, said member straddling said tongue and having one leg above the tongue, another leg below the tongue and a bight portion along one side of the tongue, said one leg having a series of holes aligned with a series of holes in the other leg, and a pin engageable with the side of said tongue opposite said one side and projectable through a selected pair of holes in said member to connect said U-shaped member and thus said link arm to the tongue.

14. Connecting means as recited in claim 13 wherein a second pin is engageable with said one side of said tongue and projectable through another selected pair of holes in said legs.

15. Connecting means as recited in claim 13 wherein there are more holes in said one leg than said other leg, the holes in said one leg including a middle group of holes to receive fastening means for connecting said link arm to said member.

16. Connecting means as recited in claim 13 wherein the axis of said pivotal connection between said one end of said link arm and said thrower is horizontal while the axis of the pivotal connection between said opposite end of the link arm to said U-shaped member is vertical.

References Cited in the file of this patent

UNITED STATES PATENTS

| | | |
|---|---|---|
| 383,183 | Leavell et al. | May 22, 1888 |
| 2,496,472 | Huddle | Feb. 7, 1950 |
| 2,537,245 | Thompson | Jan. 9, 1951 |
| 2,554,708 | Kosten | May 29, 1951 |
| 2,578,887 | Jackson et al. | Dec. 18, 1951 |
| 2,608,310 | De Penning | Aug. 26, 1952 |
| 2,724,516 | Weishaar | Nov. 22, 1955 |
| 2,789,705 | Eberly | Apr. 23, 1957 |
| 2,864,517 | Dickenshied | Dec. 16, 1958 |